May 15, 1962   J. B. PUGERUD   3,035,212
RELAY ARRANGEMENT
Filed April 16, 1958

INVENTOR
JOHN BERNT PUGERUD
By Hane and Nydick
ATTORNEYS 3,035,212
RELAY ARRANGEMENT
John Bernt Pugerud, Stockholm, Sweden, assignor to Telefonaktiebolaget L M Ericsson, Stockholm, Sweden, a corporation of Sweden
Filed Apr. 16, 1958, Ser. No. 728,924
Claims priority, application Sweden Apr. 29, 1957
3 Claims. (Cl. 317—147)

The present invention relates to an arrangement for obtaining independence of the data of the separate relays within rather wide limits and obtaining a protection against disturbances.

The advantages, that are obtained by using an arrangement according to the invention, are (1) That relays with a great dispersion in the operation limit operate at a fixed level, (2) That relays with a great dispersion in release limit release at a fixed level, (3) Causing an effective protection against disturbances and (4) Maintained sensitivity over a certain signal level.

The invention means an arrangement for controlling the operation, resp. the release current of a relay, characterized by a resonant circuit of an input filter being connected to the relay winding in question via an amplifier and a rectifier arrangement and of a load circuit containing a non-linear element and included in a feedback path and being inductively connected to said resonant circuit, thus influencing its impedance at changes in the input signal voltage.

Figure 1:
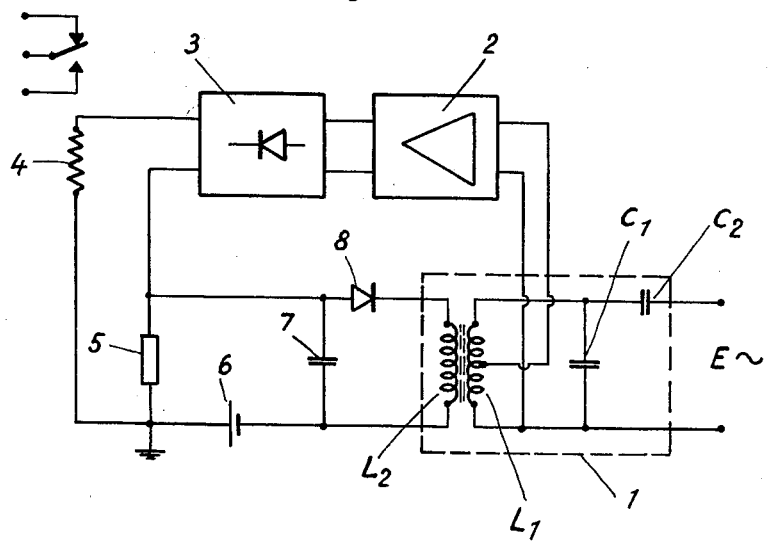
Figure 2:
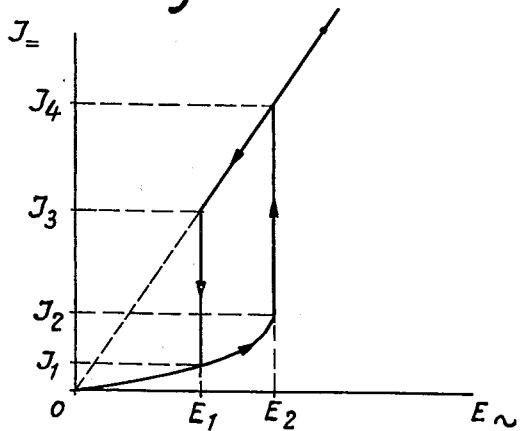
Figure 3:
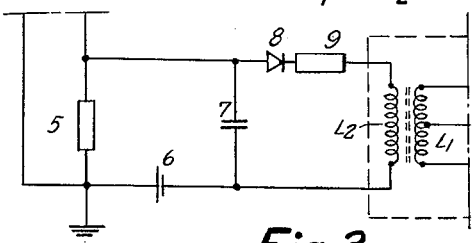

The invention is now to be further described in connection to the accompanying drawing, where FIG. 1 shows a form of embodiment according to the invention, FIG. 2 shows the voltage diagram for an arrangement according to FIG. 1, and FIG. 3 shows a modification of the circuit shown in FIG. 1.

In FIG. 1, 1 indicates a filter comprising two coils $L_1$ and $L_2$ arranged on the same core and two condensers $C_1$ and $C_2$. The tap and one end terminal of the coil $L_1$ are connected to an amplifier 2, which in turn is connected to a rectifier arrangement 3. One output terminal from this rectifier arrangement is connected to earth via a relay winding 4, while its second output terminal is earthed via a resistance 5. The winding $L_2$ is connected to earth via a rectifier source 6 and with its second end via a diode 8 connected to the end of the resistance 5, which is situated nearest the rectifier arrangement. A condenser 7 is also connected between one electrode of the diode and one pole of the voltage source 6.

The filter 1 contains inter alia the coil $L_1$ and the condenser $C_1$, which together act as a parallel resonance circuit. This circuit is then loaded via the winding $L_2$ with the diode 8 in series with the condenser 7, which latter short-circuits the signal frequency. When no signal is applied to the filter 1 the voltage source 6 produces a current through the diode 8 in its pass direction, whereby the load over said circuit increases and the Q-value of the circuit is reduced. If, on the contrary, a signal voltage $E_2$ is applied to the input of the filter this potential will pass the amplifier 2 and the rectifier arrangement 3 and generate a D.C. current through the relay winding 4. This D.C. current will cause a voltage over the resistance 5, which in turn causes a current in the blocking direction of the diode 8. The load over the resonance circuit $L_1$, $C_1$ will thereby decrease, while the Q-value of the circuit increases.

The operating manner of the arrangement is best seen in FIG. 2, which shows the correlation between the magnitude of the input signal potential and the value of the current appearing in the relay winding 4. From this can be seen that the current increases slowly with increasing potential and then increases stepwise from the value $I_2$ to the value $I_4$ at a certain potential level $E_2$, whereupon the correlation becomes linear. When then the potential decreases the correlation remains linear down to the potential value $E_1$, which is smaller than $E_2$ and corresponds to a current value $I_3$, which, when the potential drops below $E_1$, stepwise decreases to the value $I_1$ and then slowly decreases towards 0. As the relay arrangement has the relay-current signal-potential characteristic shown in FIG. 2 fixed operation and release limits are obtained, which then are common for relays with different limit data, i.e. the operation limit $E_2$ is common for all relays that operate for currents lying between $I_2$ and $I_4$, and the release limit $E_1$ is common for relays that operate for currents lying between $I_3$ and $I_1$.

One disadvantage with the arrangement according to FIG. 1 is, however, that it is sensible for temperature variations in the diode 8. To compensate this a thermistor with voltage division can be inserted instead of the battery 6, whereby a variation of the operation and release limit of circa 1 db for the temperature interval 20°–50° C. is obtained. Without this compensation, i.e. with a battery according to FIG. 1, the variation for the same temperature interval is circa 5 db.

By changing the bias voltage of the diode 8 the operation and release limits can, if desired, easily be removed to higher or lower values, whereby, however, the interval between these limits is maintained approximately. Further, if a change of said interval is desired this can be done in a simple way by connecting a series resistance 9 in the diode circuit 8 as shown in FIG. 3, whereby the operation level can be displaced when the release level is constant. By using the present arrangement in connection with signal receivers the interval is normally kept within said limits at about 3–4 db.

With an arrangement according to the invention a good safety margin is obtained regarding the operation and release of a relay in that the relay, after being operated or released, remains in this position independent of moderate variations in signal voltage or moderate in-coming disturbance voltages.

The above described arrangement states only a form of embodiment according to the invention and smaller constructive variations in the design can of course be considered without departing from the fundamental idea of the invention.

I claim:

1. A circuit system for controlling the energization and deenergization levels respectively of an electromagnetic relay, said system comprising a coil of the relay to be controlled, a filter network having two input terminals for applying signal voltages for operating the relay, said network including a pair of inductively coupled coils and a capacitance means, one of said network coils and said capacitance means being connected across said terminals to form a linear resonance circuit, an amplifying means, the input of said amplifying means being connected to one terminal of said one network coil and to one intermediate point thereof, a load resistance means, rectifying means connected to the output side of said amplifying means, said rectifying means having two output terminals, one being connected to ground through said relay coil and the other being connected to ground through said load resistance means, one terminal of the other coil of said pair of network coils being connected to ground through a voltage source and the other being connected through a non-linear circuit component to the connection between the load resistance means and the respective output terminal of the rectifying means, said load resistance means, non-linear circuit component and voltage source constituting a load circuit connected in a feedback circuit to said resonance circuit to vary the impedance of the latter corresponding to changes in the applied signal voltages.

2. A circuit system according to claim 1 and also comprising a capacitance means connected between one terminal of said voltage source and the connecting point of the non-linear circuit component and the load resistance means.

3. A circuit system according to claim 1 wherein said non-linear circuit component comprises a diode, and wherein a resistance means is connected in series between the diode and the respective terminal of said other coil of the pair of coils.

References Cited in the file of this patent

UNITED STATES PATENTS

| Re. 20,317 | Suits | Mar. 30, 1937 |
| 2,394,786 | Korneke | Feb. 12, 1946 |
| 2,518,865 | Cartotto | Aug. 15, 1950 |
| 2,694,163 | Sola | Nov. 9, 1954 |
| 2,849,662 | Britten | Aug. 26, 1958 |
| 2,931,956 | Van Arsdale | Apr. 5, 1960 |

FOREIGN PATENTS

| 44,984 | France | Feb. 4, 1935 |